Patented June 29, 1937

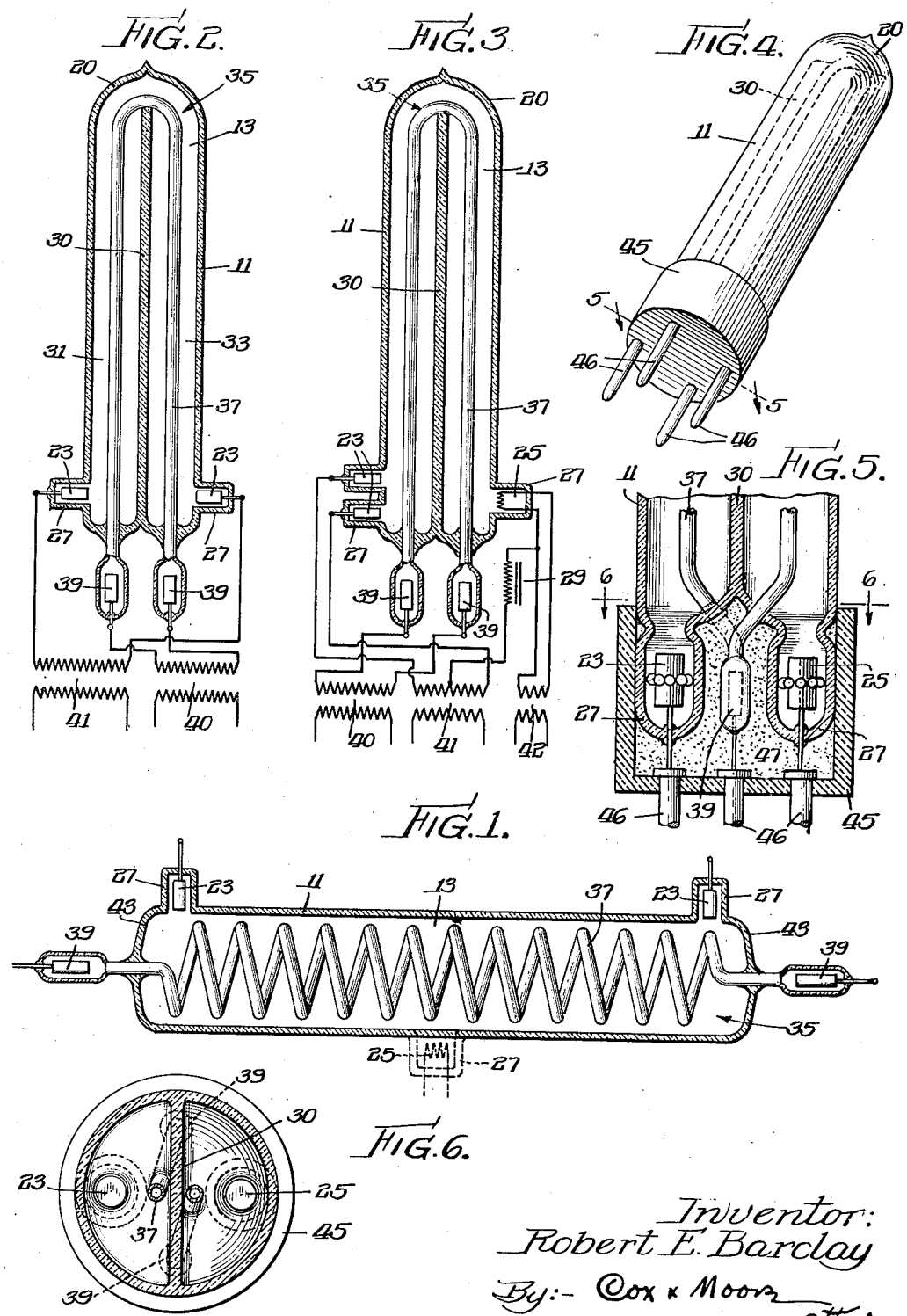

2,084,996

UNITED STATES PATENT OFFICE 2,084,996

GASEOUS CONDUCTION DEVICE

Robert E. Barclay, Chicago, Ill.

Application March 24, 1934, Serial No. 717,138

15 Claims. (Cl. 176—122)

My invention relates in general to the art of electrical discharge by gaseous conduction and relates more particularly to an improved device operated by electrical discharge in an ionized gaseous path, the invention referring particularly to a lamp containing a suitable gas adapted to glow when excited by electrical discharge therein.

Various gases, such as neon, argon, crypton, mercury vapor, carbon dioxide and the like, have the characteristic of glowing and emitting light when electrically excited. In the past, it has been necessary to utilize relatively high electrical potential difference to initiate an electrical discharge between spaced points in a gaseous medium and the necessity of applying relatively high voltage, especially when the gaseous conduction device is first started in operation, is a well recognized obstacle to the satisfactory commercial operation of gaseous conduction devices. My invention has for an important object the provision of a gaseous conduction device formed with exciting means formed as a gaseous conduction element disposed within the gaseous medium of the conduction device functioning to condition the device for starting in operation at relatively low voltage.

Another important object is to provide an exciter for a gaseous conduction device or lamp of the character mentioned, said exciter comprising a gaseous conductor element arranged in position within the gaseous medium of the conduction device and operable to induce high frequency electrostatic effects in the gaseous conduction medium of the device in order to improve its operating characteristics and permit the initiation of electrical discharge in the gaseous conduction medium at relatively low voltage.

Another important object is to provide a lamp of the character mentioned comprising a confining envelope defining a main gaseous conductor electrical discharge path and including exciter means comprising envelope means formed integral with the confining envelope of said lamp and defining a second gaseous conduction path adjacent the main path and adapted to be easily excited electrically, said exciter means being in position, when so excited, to in turn excite the conductor medium in the main path whereby to permit the initiation of electrical discharge in the main path at relatively low applied voltage.

Another important object is to provide a lamp of the character mentioned, embodying a main gaseous conduction electrical discharge path and including exciter means comprising an envelope defining a separate gaseous conduction path within said main path and adapted to be easily excited to sustain electrical discharge therein, said exciter means, when so excited, being arranged in turn to excite the conductor medium in the main path.

Another important object is to provide a gaseous conduction discharge device having gaseous conduction exciter means for ionizing or exciting the gaseous conductor medium of the discharge device sufficiently to permit an electrical discharge to be initiated in said gaseous conduction medium at an electrical potential substantially less than is necessary to strike or initiate a discharge in the medium when the same is not so excited, whereby a discharge in the gaseous conductor medium may be started and maintained by means of power supplied from a low voltage circuit.

A further object is to form the exciter means as a gaseous conduction electrical discharge device extending within the gaseous conductor medium whereby to subject the same to electrostatic effects generated by the electrical discharge in the gaseous conductor exciter.

A still further object is to form the gaseous conduction discharge device with a confining envelope enclosing a gaseous conduction medium and to form the envelope with integral means defining a channel containing the conduction medium of the exciter so that the discharge device and the exciter comprise an integral element.

Yet another object of the invention is to form the envelope of the lamp to provide a substantially U-shaped channel containing the gaseous conductor medium and to form the envelope of the exciter to provide a substantially U-shaped channel extending within the lamp channel so that the discharge path of the exciter lies within the discharge path of the lamp substantially throughout its entire extent, said structure further permitting the lamp and exciter both to be powered through leads connected to the device at one end only thus providing an unusually convenient form.

Another object is to provide a lamp comprising an envelope defining a gaseous conduction path and including a gaseous conduction exciter comprising a tubular envelope within the gaseous conduction path of the lamp and to fill the lamp envelope and the exciter envelope with gaseous conduction media, adapted, when excited, to produce a combined light of desired spectral character.

Among the other important objects is in general to accomplish the numerous improvements, in the technique of electrical illumination by discharge in a gaseous conductor medium, which will become apparent as the invention is more clearly understood from the following description, which, taken in connection with the drawing, discloses devices embodying the invention.

Referring to the drawing:

Figures 1, 2 and 3 are longitudinal sections taken through lamps embodying my present invention;

Figure 4 is a perspective view of a modified form of the lamp shown in Figure 2, showing the adaptation of the lamp as a unit to which power may be delivered through connections formed at one end of the unit only;

Figure 5 is a sectional view taken substantially along the line 5—5 in Figure 4; and Figure 6 is a sectional view taken substantially along the line 6—6 in Figure 5.

To illustrate my invention, I have shown on the drawing gaseous conduction lamps having built-in means for exciting the gaseous conduction medium to permit electrical discharges to be initiated therein at relatively low voltage. The lamps shown comprise envelope means 11 formed preferably of any suitable light-transmitting material, such as glass, defining a channel 13 containing a suitable gaseous medium, such as neon, argon, crypton, mercury vapor, carbon dioxide or other gas or combination of gases, capable of being electrically excited to glow. Spaced electrodes 23 and 25 are arranged on the envelope, preferably in position exposed in the channel 13 by which an electrical potential difference may be applied for the purpose of exciting the medium in the chamber 13.

As shown in Figure 1 the envelope 11 may comprise an elongated tubular element which is sealed at its opposite ends to provide a hermetic housing. The tubular element may be straight, as shown with the electrodes at its opposed ends, or the element may be bent at its mid-point to form the chamber 13 as a U-shaped channel having adjacently arranged arms 31 and 33 with the electrodes at the adjacent terminal ends of the arms, so that power connections may be conveniently made at one end of the device. Where it is desired to form the device with a U-shaped channel, I prefer to fabricate the envelope from a suitable length of integrally partitioned tubing of the character shown and described in my United States Patent No. 1,904,348 issued April 18, 1933, by sealing a dome 20 on one end of the length of tubing and by sealing the opposed end of each channel of the tubing. This procedure provides an envelope having cylindrical outer walls and an integral internal partition 30 defining a U-shaped channel within the walls having legs 31 and 33 extending on opposite sides of the partition 30.

The electrodes 23 and 25 may be mounted in housings 27, forming envelope extensions and may be of any suitable or preferred form.

Discharge devices embodying my present invention depend for their operation upon the initiation and maintenance of electrical discharges in an ionized field between spaced stations, preferably formed as electrodes, carrying opposite electrical charges, the discharge occurring in the gaseous conduction medium, from a negatively charged station or anode, to a positively charged station or cathode which is called the target. Such discharges may be initiated by applying direct current between the electrodes in which the anode and cathodes maintain their character as such throughout the operation of the device. Alternately, the discharges may be caused by the application of alternating potential between the electrodes, in which case the electrodes alternate their status as anode and cathode with each reversal of the applied potential.

As shown in Figures 1 and 2, the electrodes are two in number and are preferably formed as taught in my co-pending application, Serial Number 570,717, filed the 23rd day of October, 1931, the electrode arrangement forming a device adapted for operation in response to the application either of alternating or direct electrical potential between the electrodes. Alternating current power may be applied from a distribution system comprising in the illustrated embodiment a transformer 41 while direct current power may be supplied by means of direct current bus conductors.

When alternating potential is applied between the electrodes 23 in the devices shown in Figures 1 and 2, each electrode alternately functions as anode and cathode while if direct potential is applied between the electrode, one functions as an anode and the other as a cathode. It is also within the contemplation of my invention to provide for exciting one or more of the electrodes themselves, in order to promote the efficiency of the device and to this end, the electrodes 23 may be of filamentary form having means for heating or otherwise energizing the electrode from an external power source in order to promote electron emission at the electrode which aids in the establishment of electrical discharge within the chamber 13 between the spaced electrode.

Where the device is operated with direct potential applied between the spaced electrodes, it is particularly desirable to provide means for thus directly exciting the electrode forming the cathode target.

Alternating current may also be used to energize a device having a permanent cathode electrode by providing the device with a plurality of anode electrodes 23, spaced apart and from the cathode target 25, as shown in Figure 3. In such an arrangement, means is provided for applying alternating potential between the anode electrodes 23 while connecting the cathode target to a neutral point in the alternating potential supply system. By this expedient, the device is constituted as a rectifier, the discharges taking place in a uni-directional manner successively from the several anodes to the cathode target during each alternation of the potential applied at the anodes. While I have shown in Figure 3 a cathode target 25 comprising a filamentary electrode having connected conductors for exciting the electrode from an external power source, a non-excitable or "cold" electrode of the form shown at 23 may be provided in place of the filamentary electrode shown. The cathode electrode 25, however, whether filamentary or otherwise, is connected preferably through a current limiting reactance 29 to a neutral point of the alternating current power supply system through which power is delivered between the anodes 23. While I have shown in Figure 3, a device arranged for single phase operation, I may provide additional anode electrodes to form a device capable of multi-phase operation as shown in my co-pending application, Serial Number 705,393, filed January 5, 1934.

Ordinarily, it would be necessary to apply a relatively high potential difference between the electrodes in order to initiate discharges in the gaseous conduction medium contained within the chamber 13. I have found, however, that by exposing the gaseous conductor medium to the effects of high frequency oscillations, it is possible to initiate and maintain electrical discharges in the medium contained in the chamber 13 with substantially less voltage applied between the discharging electrodes. This advantage is particularly noticeable when the envelope 11 is formed with closely adjacent chamber portions 31 and 33 separated by dielectric means preferably formed as an integral part of the envelope 11 and forming a condenser between the chamber portions 31 and 33.

In order to provide for exciting the gaseous medium within the chamber 13, I arrange a gaseous conduction discharge element 35 in position such that it will apply the electrostatic effect, initiated by electrical discharges therein, to the gaseous conduction medium within the chamber 13. The element 35, preferably comprises a tubular envelope 37 of suitable preferably light-transmitting material such as glass which is sealed at its opposite ends and provided with electrodes 39 by means of which electrical discharge may be initated in the conduction medium within the envelope 37. A portion of the envelope 37 preferably extends within the chamber 13 and while the entire exciter device may be located within the envelope 13, I prefer to arrange the exciter with its electrode containing ends extending outwardly of the chamber 13, the remainder of the envelope 37 extending within the chamber 13, and means is provided for applying electrical potential to the electrodes 39 from a suitable external source of power 40.

In the embodiment shown in Figure 1, the tubular envelope 37 is arranged in the form of a helix in order to increase its effective length within the chamber 13 while in the embodiments illustrated in Figures 2 and 3, the element 37 is of substantially U-shaped configuration following the general contour of the U-shaped chamber 13 so that the exciter element extends throughout the entire length of the chamber 13. It will be noted also that the walls of the envelope 11 are sealed about and to the element 37 at the places where said element extends through the envelope so that the envelope 11 and the element 37 comprise an integral structure while the envelope 11 forms a hermetic closure for the gases within the space 13 and about the element 37. The straight form shown in Figure 1 may be made by first fabricating the envelope 11 with open ends, assembling the element 37 in concentric relationship therein and finally sealing the end portions 43 of the open ended envelope 11 upon the element 37 near the electrodes 39. If desired also, the straight form shown in Figure 1 may be constructed for rectifying operation by applying a permanent cathode target as indicated in dotted lines at 25, power being applied to the electrodes 23 and 25 from any suitable source as by means of system similar to that shown in Figure 3. Obviously the cathode target need not necessarily be of filamentary type as heretofore mentioned in connection with Figure 3. Where the device of Figure 1 is arranged for rectifying operation, it is also possible to position the electrodes 23 at one end of the envelope 11, the cathode target 25 being arranged at the other end and obviously it is also within the confines of my present invention to provide for three phase operation in the manner heretofore suggested in connection with the form shown in Figure 3.

The forms shown in Figures 2 and 3 may be fabricated by preforming the U-shaped exciter element 35 and assembling it in the multi-bore tube prior to the application of the dome 20 and the seals at the lower end of the channels 31 and 33, the element 35 being applied with an arm extending in and through each of the channels 31 and 33. The lower ends of the channels 31 and 33 may then be sealed around and to the lower ends of the legs of the element 35 adjacent the electrodes 39 and the dome 20 may then be applied.

Before finally sealing the envelope 11, it is, of course, necessary to evacuate the chamber 13, purify it and the electrodes 23 and 25 as by bombarding and finally fill the chamber 13 with the gaseous conductor medium before the envelope is permanently sealed to form a hermetic closure for the gaseous medium.

One of the obvious advantages of the forms shown in Figures 2 and 3, wherein the opposite ends of the channel 13 are adjacently disposed, is that the electrode housings 27 and the ends of the element 35 containing the electrode 39 may be arranged for reception in a base 45, which is or may be provided with terminal means 46 of suitable form and connected with the electrodes 23, 25 and 39 whereby to facilitate the electrical connection of said electrodes with suitable sources of power for energizing the device. The electrode carrying base 45 may be formed for detachable insertion in a socket receptacle of standard form in order to accomplish this at minimum expense. It is not, of course, essential to the invention to provide a base of this character and, in large units, the provision of a supporting base of the character described may not even be desirable. In small units, however, the provision of the base results in the production of a readily replaceable device having obvious advantages. The lower portions of the envelope and the projecting ends of the element 35 are or may be secured in the base as by embedding them in a suitable insulating compound 47 contained within the base so that the base forms a support or carrier for the envelope. Where a base is not provided, any suitable supporting device or devices as for instance, clamps, clips and other suspension means may be employed for supporting the unit in operating position.

As soon as electrical potential of sufficient voltage is applied between the electrodes 39 to initiate a discharge within the element 35, the gaseous conducting medium within the envelope 11 and around the element 35 will become excited to a degree permitting initiation and maintenance of an electrical discharge in said gaseous conducting medium at appreciably lower voltage than is required to initiate the discharge where the conduction medium is not so excited. The device 35 may require the application of relatively high electrical potential between the electrodes 39, but the power consumed by the exciter device is relatively low on account of the relatively small cross-sectional area of the envelope 37. The over-all efficiency of the unit, however, is greatly improved by the provision of the exciter because the voltage required to create discharges in the medium contained in the envelope 11, which has relatively large cross-sectional area, is substantially less than if an exciter is not provided. The saving in power required to operate the main lamp is larger than the power required by the exciter. After the initiation of the discharge in the chamber 13, the exciter may be discontinued from operation if desired, in which case it is necessary only to maintain sufficient voltage between the electrodes 23 and 25 to keep the device in operation. The exciter may, however, be maintained in continuous operation in which case it is frequently possible to maintain a discharge between the electrodes 23 and 25 at voltages which would not even maintain, let alone start, the device in operation if the exciter was absent.

The conduction media in the channel 13 and in the exciter 35 may be selected to provide different colored light when in operation so that the light emitted from the unit is a combination of colors produced by the excitation of the several media, for instance, neon gas when excited glows with a characteristic red color, carbon dioxide produces a dazzling white light, mercury vapor, when excited, produces blue light, and other gases have each their characteristic color when electrically excited. It is also within the contemplation of my present invention to operate either or both of the discharge devices discontinuously in order to produce a changing color effect.

It is thought that the invention and numerous of its attendant advantages will be understood from the foregoing description and it is obvious that numerous changes may be made in the form, construction, and arrangement of the several parts without departing from the spirit or scope of my invention, or sacrificing any of its attendant advantages, the forms herein described being preferred embodiments for the purpose of illustrating my invention; but I do not herein claim the broad aspects of the invention residing in the combination of an exciter with a gaseous conduction lamp, since the same forms the subject matter of my copending application Serial No. 706,670, filed January 15, 1934, nor do I claim herein broadly a tubular gaseous conduction exciter in combination with a main gas conduction device since the same forms subject matter of my copending application Serial No. 705,393, filed January 5, 1934.

Having thus described my invention, what I claim as new and desire to secure by Letters Patent is as follows:

1. In combination, a discharge device comprising means forming a pair of adjacently disposed discharge channel portions containing a gaseous conduction medium, dielectric means extending between said portions, and an exciter comprising envelope containing a gaseous conductor medium means, in which high frequency oscillations may be set up, disposed within said channel portions and in electrostatic relationship with respect to said dielectric means.

2. In combination, a discharge device comprising means forming an elongated channel containing a gaseous conductor medium, and means, comprising coiled tubular means containing a gaseous conductor medium, in which high frequency oscillations may be set up, said tubular means extending in the gaseous medium in said elongated channel.

3. In combination, a discharge device comprising means forming an elongated channel containing a gaseous conductor medium, and means comprising bent tubular envelope means containing a gaseous conduction medium in which high frequency oscillations may be set up, said envelope means extending in the gaseous medium throughout substantially the entire length of said channel.

4. In combination, a discharge device comprising means forming a substantially U-shaped compartment having adjacently disposed portions containing a gaseous conduction medium, and an exciter, comprising an elongated envelope of U-shaped configuration, containing a gaseous conduction medium, in which high frequency oscillations may be set up, extending within said U-shaped compartment substantially throughout its entire length.

5. In combination, a discharge device comprising means forming a substantially U-shaped compartment having adjacently disposed portions containing a gaseous conduction medium, an exciter, comprising an elongated envelope of U-shaped configuration, containing a gaseous conduction medium in which high frequency oscillations may be set up, extending within said U-shaped compartment substantially throughout its entire length, and means to create a high frequency electrical discharge in said elongated envelope for the purpose of exciting the gaseous medium in said compartment.

6. In combination, a discharge device comprising means forming a compartment containing a gaseous conduction medium, an exciter comprising coiled conductor means, in which high frequency oscillations may be set up, extending within said compartment substantially throughout its entire length, said conductor means comprising an elongated tubular envelope containing a gaseous conductor, and means comprising spaced electrodes on said tubular element for the purpose of creating electrical discharges in the gaseous conductor within said tubular element in order to excite the gaseous medium in said compartment.

7. In combination, a discharge device comprising means forming a compartment containing a gaseous conduction medium, an exciter comprising conductor means extending within said compartment substantially throughout its entire length, said conductor means comprising a sealed envelope containing a gaseous conductor, means to create high frequency electrical discharges in said gaseous conductor for the purpose of exciting the gaseous medium in said compartment, and means to apply electrical potential difference in said gaseous medium between the opposed ends of the compartment and a point substantially midway between said ends.

8. In combination, a discharge device comprising means forming a compartment containing a gaseous conduction medium, an exciter comprising coiled conductor means extending within said compartment substantially throughout its entire length, said conductor means comprising a sealed element containing a gaseous conductor, means to create high frequency electrical discharges in said gaseous conductor for the purpose of exciting the gaseous medium in said compartment, and means comprising spaced electrodes on said compartment for applying electrical potential difference at spaced-apart points in the gaseous medium therein.

9. In combination, a discharge device comprising means forming a compartment containing a gaseous conduction medium, an exciter comprising conductor means extending within said compartment substantially throughout its entire length, said conductor means comprising a sealed element containing a gaseous conductor, means to create high frequency electrical discharges in said gaseous conductor for the purpose of exciting the gaseous medium in said compartment, anode means at each of the ends of the compartment, and cathode means associated with the gaseous medium and positioned substantially equi-distant from each of said anode means.

10. In combination, a discharge device comprising means forming a compartment containing a gaseous conduction medium, an exciter comprising conductor means extending within said compartment substantially throughout its entire length, said conductor means comprising a sealed element containing a gaseous conductor, means to create high frequency electrical discharges in said gaseous conductor for the purpose of exciting the gaseous medium in said compartment, and a plurality of anodes and a cathode target operatively associated with said compartment, the anodes being substantially equi-distant from said target.

11. In combination, a discharge device comprising means forming a compartment containing a gaseous conduction medium, an exciter comprising conductor means extending within said compartment substantially throughout its entire length, said conductor means comprising a sealed element containing a gaseous conductor, means to create high frequency electrical discharges in said gaseous conductor for the purpose of exciting the gaseous medium in said compartment, and a plurality of anodes and cathode target means operatively associated with said compartment, whereby, upon application of alternating electrical potential between said anodes, electrical discharges may be set up in the gaseous medium therein successively between the several anodes and the cathode target means.

12. In combination, a discharge device comprising an elongated envelope having an integral partition defining a channel in said envelope having adjacently disposed legs on opposite sides of said partition, a gaseous conductor medium in said channel, and an exciter comprising a tubular element, containing a gaseous conduction medium in which high frequency oscillations may be set up, said tubular element having portions extending in said adjacent legs of the channel and on opposite sides of said partition and in electrostatic relationship with respect to the gaseous medium in the channel.

13. In combination, a discharge device comprising envelope means defining a chamber containing a gaseous conductor medium, and an exciter comprising a tubular envelope containing gaseous conduction means in which high frequency oscillations may be set up, said tubular envelope being disposed in coils within and substantially filling the chamber and extending in electrostatic relationship with respect to the gaseous medium therein.

14. In combination, a discharge device comprising envelope means defining an elongated channel containing a gaseous conductor medium, and an exciter comprising a tubular conductor element forming an envelope containing a gaseous conduction medium and disposed in helical coils within and substantially filling said channel.

15. In combination, a discharge device comprising an elongated envelope having an integral partition defining a channel having adjacently disposed legs on opposite sides of said partition, means to promote electron flow in said channel, and means comprising a tubular element, containing a gaseous conduction medium in which high frequency oscillations may be set up, said tubular element having portions extending in the adjacent legs of said channel and on opposite sides of said partition in position to create electrostatic effects in said channel for the promotion of electron flow therein.

ROBERT E. BARCLAY.